Figure 1:
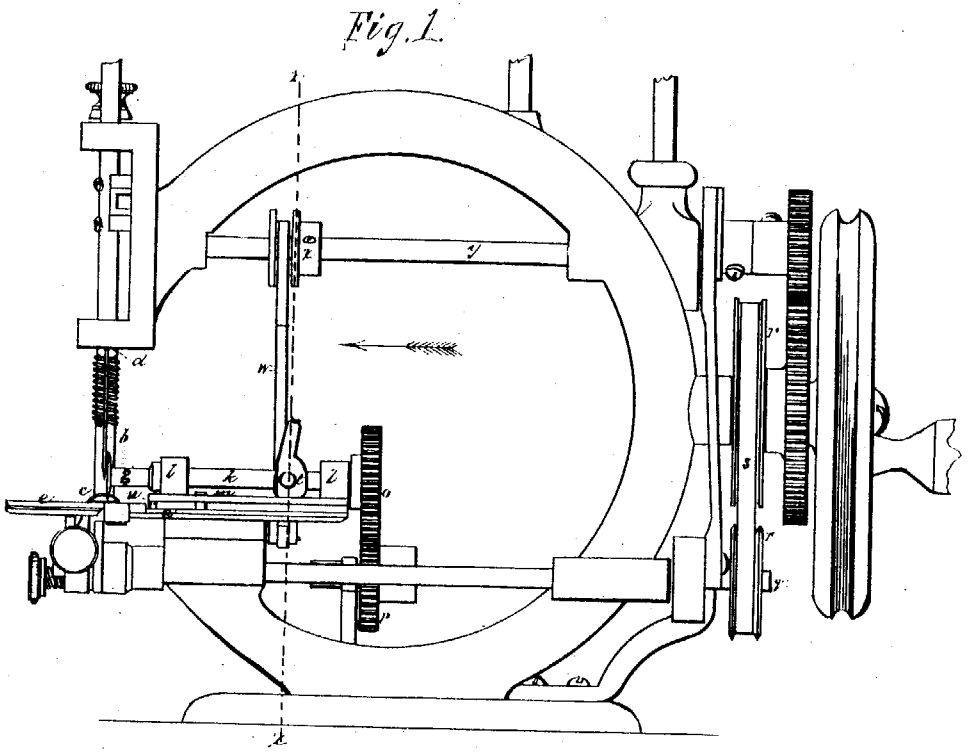

2 Sheets--Sheet 1.

W. A. SPRINGER.

Trimming and Cutting Attachment for Sewing-Machines.

No. 6,592. Reissued Aug. 10, 1875.

Witnesses:
Edward F. Johnson
Fred L. Felton

Inventor:
William A. Springer

N. PETERS, PHOTO-LITHOGRAPHER, WASHINGTON, D. C.

W. A. SPRINGER.

Trimming and Cutting Attachment for Sewing Machines.

No. 6,592. Reissued Aug. 10, 1875.

*Witnesses;*
Edward F. Johnson
Fred C. Fitton

*Inventor;*
William A. Springer

N. PETERS, PHOTO-LITHOGRAPHER, WASHINGTON, D. C.

UNITED STATES PATENT OFFICE.

WILLIAM A. SPRINGER, OF MARLBOROUGH, MASSACHUSETTS.

IMPROVEMENT IN TRIMMING AND CUTTING ATTACHMENTS FOR SEWING-MACHINES.

Specification forming part of Letters Patent No. 147,441, dated February 10, 1874; reissue No. 6,088, dated October 13, 1874; reissue No. 6,592, dated August 10, 1875; application filed March 18, 1875.

DIVISION A.

*To all whom it may concern:*

Be it known that I, WILLIAM A. SPRINGER, of Marlborough, in the county of Middlesex and Commonwealth of Massachusetts, have invented an Improved Trimming or Cutting Attachment for Sewing-Machines; and I do hereby declare that the following, taken in connection with the drawings which accompany and form a part of this specification, is a description of my invention sufficient to enable those skilled in the art to practice it.

United States Letters Patent No. 142,290, dated August 26, 1873, were granted to me for an improvement in trimming attachments for sewing-machines, and which patent has since been reissued under date of November 17, 1874. In said original and reissued patents a rotary disk-cutter is shown fixed on a shaft above the work-supporting plate, and having a positive continuous rotative movement imparted to it, the bottom of the cutting-edge extending down below the top surface of the work-plate, and close to the path of the needle, and the cutter operating to trim off the edge of the work, so as to leave a finished edge parallel to or equidistant on the line of stitches. In my present invention I use a similar cutter, and for the same purpose; but to improve its cutting action, and to render the edge more enduring as to keenness, while at the same time presenting less resistance to the material during the operation of the feeding device, the cutter has imparted to it not only a positive and continuous rotative movement, but also a reciprocating up-and-back movement, the cutter being raised up and back from in contact with the material or work being sewed or stitched while the work is fed, and descending and moving against the work, and cutting and trimming the edge of the same, only when the work or material being sewed or stitched is stationary. Operated in this manner I find that the cutting is more easily performed, and that the cutting-edge is not dulled so soon as when the work is fed forward against a cutter which remains in contact all the time with the material or work during the operation of trimming.

My present invention consists, primarily, in the combination, with the stitch-forming and feeding mechanism, of a cutter having the combined rotative and reciprocating vertical or up-and-back movements above described, thereby constituting a positively-rotating, but intermittingly-acting, trimming-cutter.

The drawings represent a machine embodying the invention.

Figure 2:
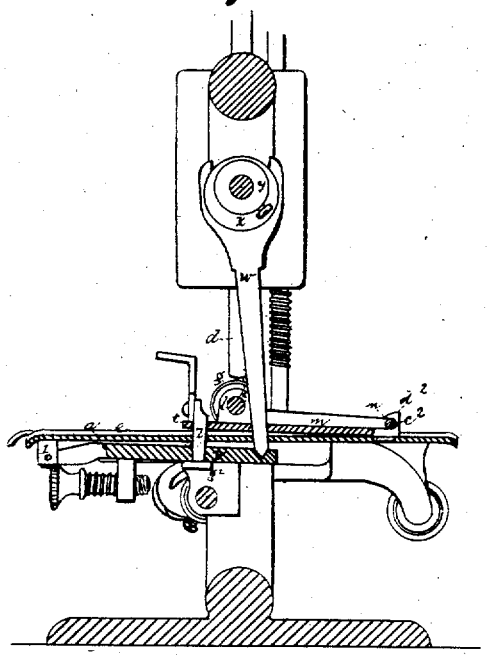
Figure 3:
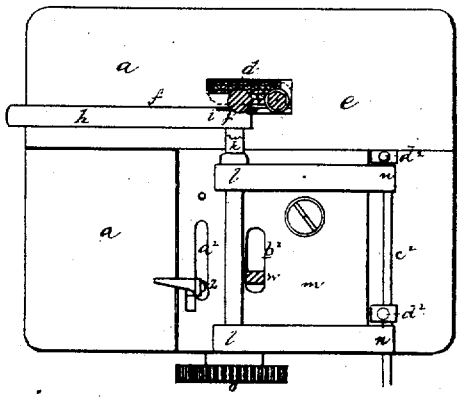

Figure 1 shows and represents a side elevation of the machine. Fig. 2 represents a vertical section on line *x x*, Fig. 1; and Fig. 3 represents a plan or top view of the work-plate and the mechanism thereon.

In the drawings, the part marked *a* denotes the work-plate, *b* the needle, *c* the presser-foot, and *d* the needle-bar, of an ordinary sewing-machine. The front part of the work-plate is shown as covered by a thin plate, *e*, in which is made a narrow slot or groove, *f*, the front wall of which forms an edge, against which the straight face of the cutter-wheel *g*, or the edge of such wheel runs to cut with a shear-cut. This groove or slot I prefer to make by forming the plate *e* with a long slot, one wall of which makes the wall against which the cutter plays, and with a slide, *h*, running into this slot, this slot being cut away at *i* to form the groove, the edge *j* forming one wall thereof. The cutter *g* is fixed upon the end of a shaft, *k*, turning in bearings *l* on a plate, *m*, which plate is hinged at *n*. The opposite end of the shaft bears a gear, *o*, which meshes into and is driven by a gear, *p*, on a shaft, *q*, connected to the driving-shaft by pulleys *r r* and belt *s*. The plate *m* can swing up and back on the hinge-pin or fulcrum $c^2$, and is pressed up against a stop-lever, *t*, by a suitable spring, *u*. Under the work-plate *a* is a lever, *v*, hinged at 1, and connected by a link or intermediate arm, *w*, with an eccentric, *x*, on the needle-driving shaft *y*, and from this lever extends an arm, *z*, to which the stop-lever *t* is jointed, the arm extending through the work-plate and through a slot, $a^2$, in the hinged plate, while the lower end of the link or intermediate arm *w* extends through the work-plate and through a slot, $b^2$, in the hinged plate.

As the shaft *y*, in turning, throws down the needle, the eccentric depresses the link or intermediate arm *w*, and the link or intermediate arm *w* the lever *v*, the lever, by its connection with the stop-lever *t*, against which the spring bears the hinged plate, and thereby carrying the cutter-shaft and cutter down, the descent of the cutter being after the feed of the work, so that the cutter acts both by its downward and forward movement, as well as by its rotative movement. As the shaft $y$ turns to raise the needle, the eccentric permits the link or intermediate arm $w$ to rise, and the spring throws up the hinged plate and the cutter, the rise taking place before the work is fed. By turning the lever $t$ down to the plate $m$, the plate will be raised by its spring sufficiently to permit the work to be readily introduced beneath the cutter-wheel. The plate $m$ is hinged to a fulcrum-pin, $c^2$, extending through ears or bearings $d^2$, and when the plate is raised it may be slid back upon the pin $c^2$, the slots $a^2$ $b^2$ permitting the plate to move laterally. When thus moved work may be introduced over the greater part of the surface of the work-plate for common sewing, or when there is to be no trimming; and by withdrawing the pin $c^2$, and the pin $z$ and nut $g^2$, the plate $m$ and link or intermediate arm $w$ may be wholly removed, and also the bearings $d^2$, each of which is made with a screw-shank, which is screwed into a nut-thread in the work-plate.

From the foregoing description it will be seen that the trimming-cutter acts independently of the needle and needle-arm, and moves away from the material to be cut before the feed commences, and does not return to act upon the material until after the feed has taken place and the needle has entered the material; consequently the presser-foot and needle both unite in holding the material against the action of the trimming-cutter.

Having described one good and desirable way of applying my said improvements in trimming or cutting attachments for sewing-machines to practical use, what I claim therein as new and of my invention, and desire to secure by Letters Patent in this division of reissue, is—

1. In combination with a stitch-forming and feed mechanism of a sewing-machine, a positively-rotated, but intermittingly-acting trimming-cutter, for the purposes stated.

2. In combination with a stitch-forming and feed mechanism, a positively-rotated cutter, having a vertically-reciprocating movement, substantially as and for the purposes set forth.

3. In combination with the plate $a$, the slide $h$, cut to form the slot or groove $i$, substantially as shown and described.

4. The hinged bearing-plate $m$, carrying a cutter, and having a spring to force it upward, combined with an eccentric, $x$, and link or intermediate arm $w$, to force it downward, substantially as shown and described.

5. The eccentric $x$, link or intermediate arm $w$, lever $v$, arm $z$, cam-lever $t$, and plate $m$, combined and operating substantially as shown and described.

6. In combination with the hinged plate for supporting the cutter, the removable bearings $d^2$, substantially as shown and described.

WILLIAM A. SPRINGER.

Witnesses:

EDWARD F. JOHNSON,

FRED. L. FELTON.